J. B. & G. H. ARMITAGE.
FENDER FOR AUTOMOBILE TRUCKS.
APPLICATION FILED FEB. 3, 1914.
1,128,833.
Patented Feb. 16, 1915.
3 SHEETS—SHEET 1.
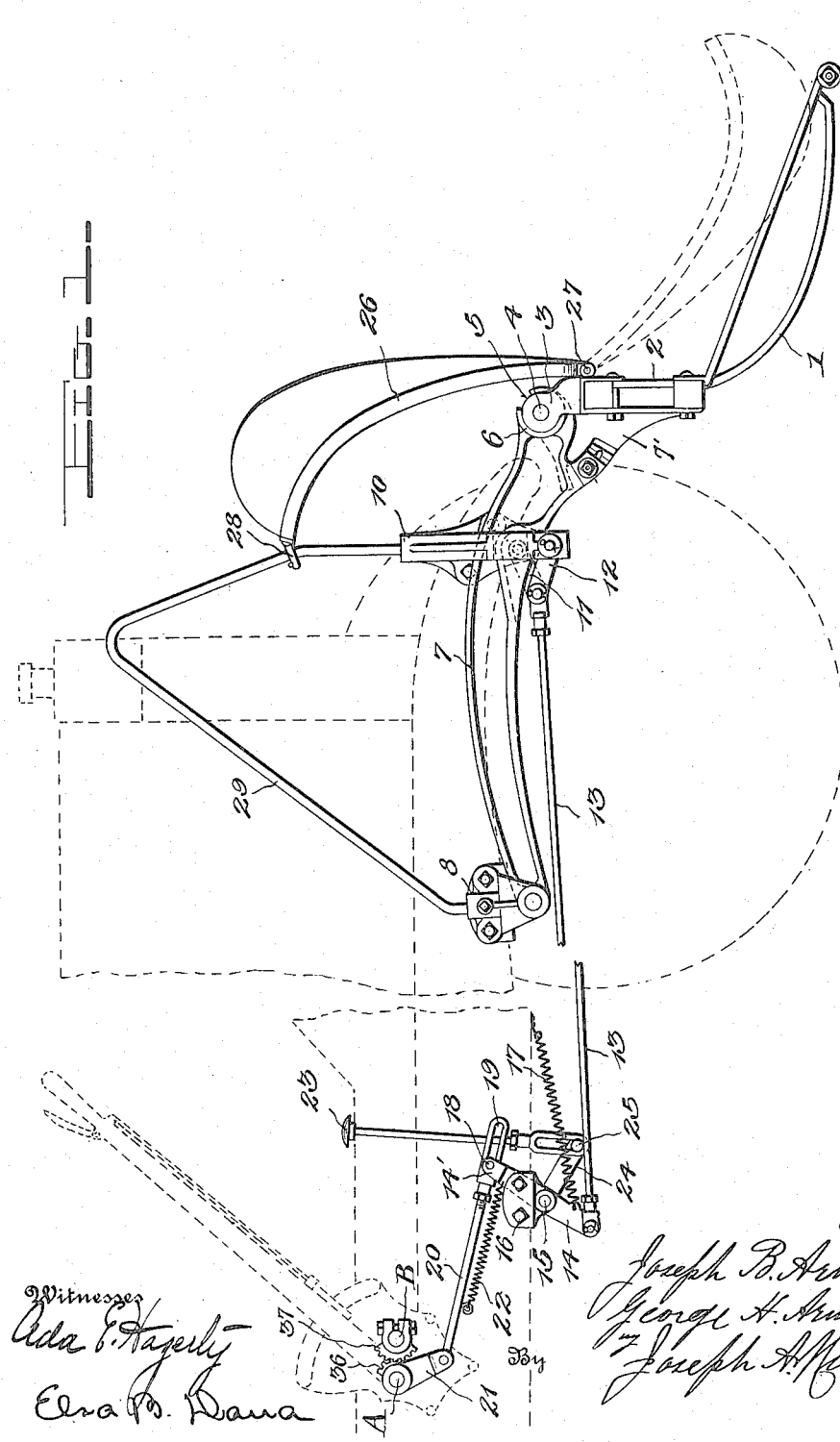
Inventors
Joseph B. Armitage
George H. Armitage
By Joseph H. Miller
Attorney
Witnesses
Ada E. Hagerty
Elsa D. Dana

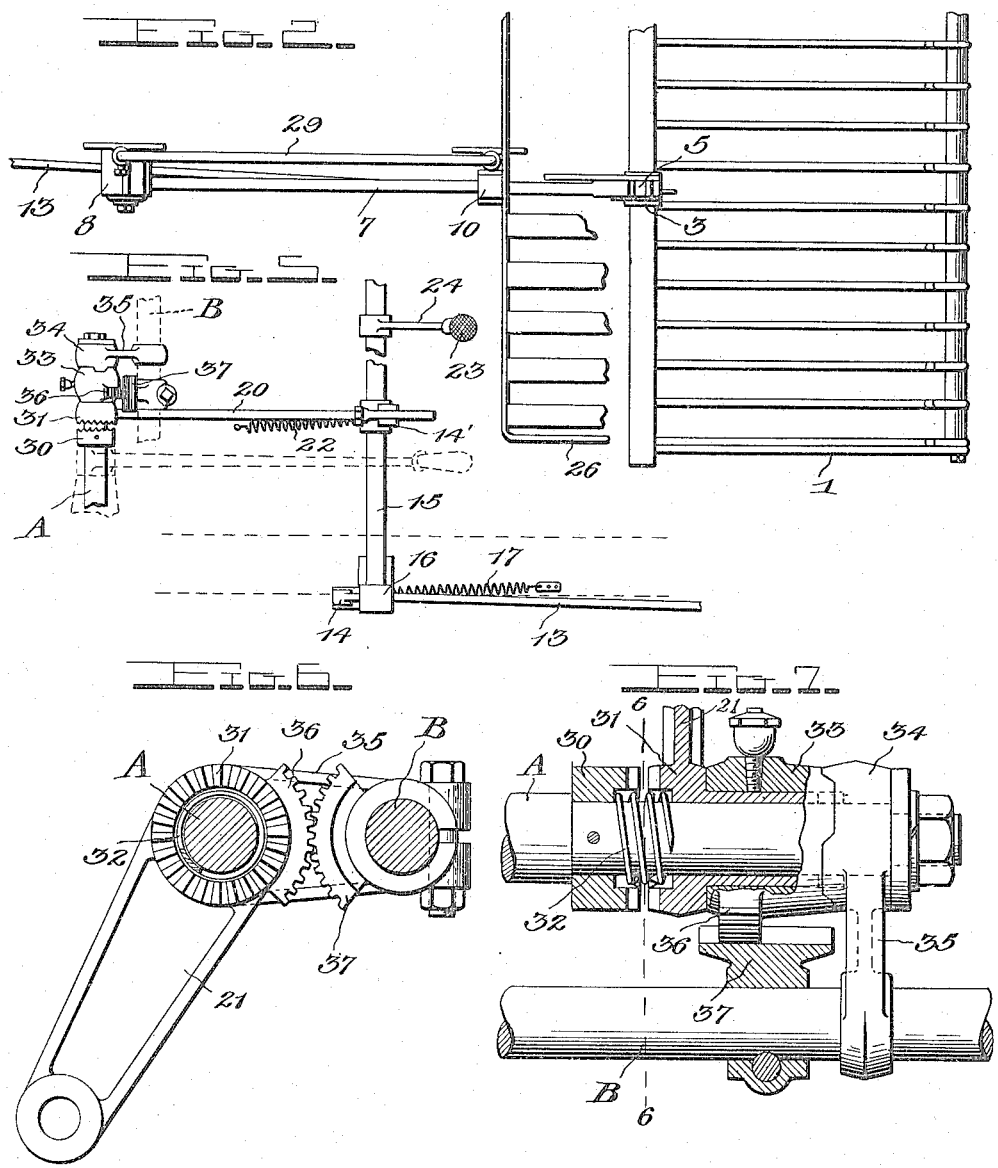

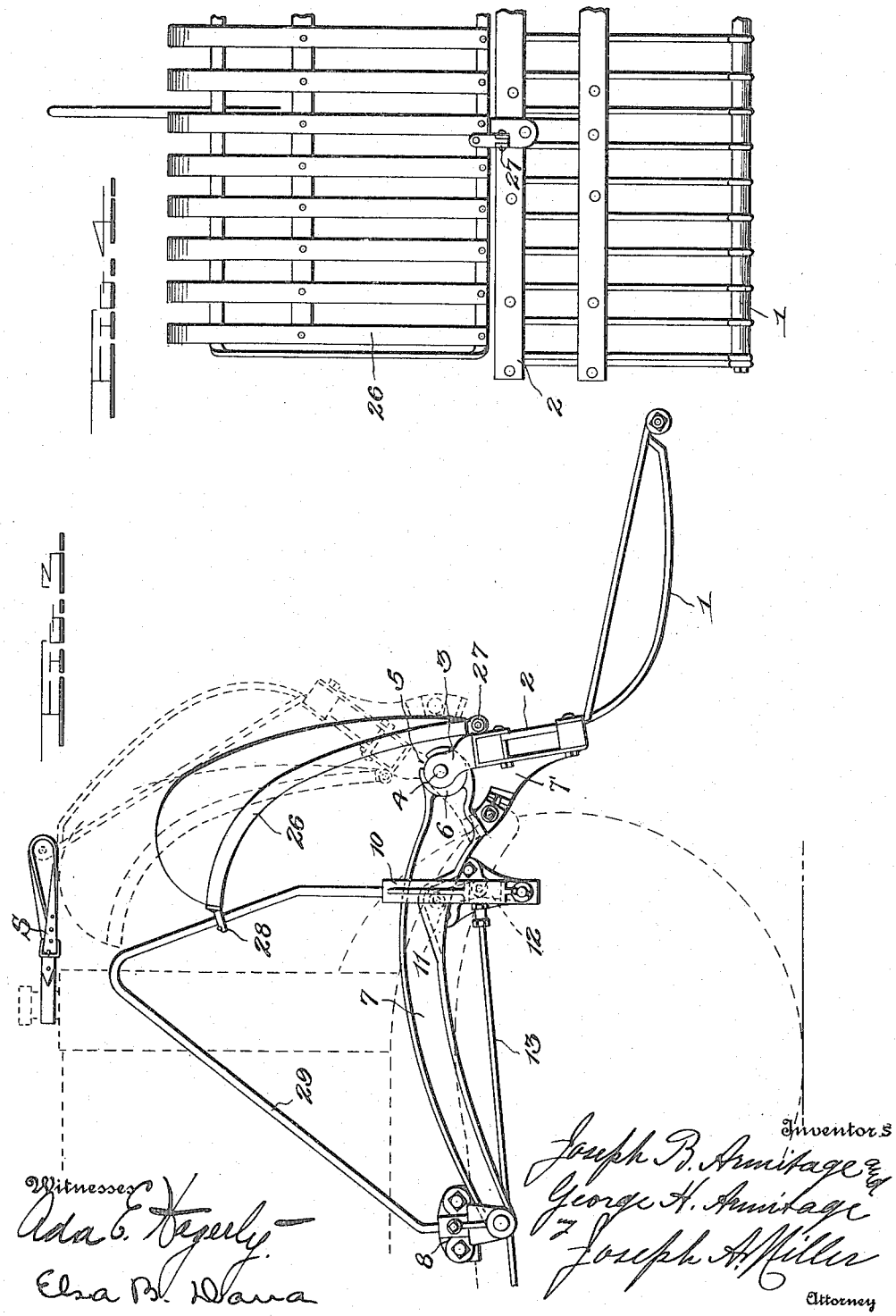

UNITED STATES PATENT OFFICE.

JOSEPH B. ARMITAGE, OF PAWTUCKET, AND GEORGE H. ARMITAGE, OF WOONSOCKET, RHODE ISLAND, ASSIGNORS TO CONSOLIDATED CAR FENDER COMPANY, OF PAWTUCKET, RHODE ISLAND, A CORPORATION OF RHODE ISLAND.

FENDER FOR AUTOMOBILE-TRUCKS.

1,128,833.          Specification of Letters Patent.         Patented Feb. 16, 1915.

Application filed February 3, 1914. Serial No. 816,331.

*To all whom it may concern:*

Be it known that we, JOSEPH B. ARMITAGE and GEORGE H. ARMITAGE, a citizen of the United States and a subject of the King of Great Britain, respectively, and residing, respectively, at Pawtucket, in the county of Providence and State of Rhode Island, and Woonsocket, in the county of Providence and State of Rhode Island, have invented a new and useful Improvement in Fenders for Automobile-Trucks, of which the following is a specification.

This invention relates to certain new and useful improvements in fenders for automobile trucks and relates more particularly to means for throwing or actuating same in or to operative position.

The primary object of the invention is to provide means whereby when the emergency brake is operated, the fender will be moved into operative or rescue position, and to also provide means whereby the emergency brake may be operated without operating the fender.

Further, the invention aims to provide novel, improved and simplified means for throwing the fender into operative position, and to also provide auxiliary means that can be operated independently of the emergency brake fender operating means, to enable the fender to be moved into operative position without application of the emergency brake.

Still further, the invention has for its object means that allows the fender proper to be easily and quickly removed from and applied to the automobile, and to also provide a cushioning member which can be easily moved so as to permit cranking of the car.

The invention also aims to provide means which operates the fender to rescue position, which means automatically locks or holds the fender in raised or inoperative position.

In the drawings—Figure 1 is a side elevation, partly broken away, of the invention. Fig. 2 is a fragmentary top plan view. Fig. 3 is a fragmentary side elevation of the front of the apparatus, showing the parts in raised position in dotted lines. Fig. 4 is a fragmentary front elevation. Fig. 5 is a fragmentary top plan view of the invention. Fig. 6 is a section taken on the line 6—6 of Fig. 7, and Fig. 7 is a side elevation partly broken away and shown in section of the clutching mechanism.

The fender 1 is rigidly secured to a frame 2 of any suitable construction, the frame having end brackets 3 provided with pins 4 which extend toward each other and which are insertible through slots 5 of bearings 6 that are carried by the forward or front ends of arms 7 arranged at each side of the automobile body or frame. The rear ends of the arms 7 are pivoted to brackets 8 which are rigidly secured to the automobile frame or body. The forward end portions of the arms 7 slidingly extend through brackets 10 which are also secured to the automobile frame or body in advance of the brackets 8 so as to have vertical reciprocatory movement in brackets 10.

One of the arms 7 has the upper link 11 of a toggle joint pivoted thereto, the lower link 12 of which toggle joint is pivoted to the lower end of the adjacent bracket 10, in order that movement of the toggle joint will raise and lower the arms 7 in an obvious manner. A rod 13 is connected to the toggle joint and is pivoted to the lower end of an arm 14 which latter is rigidly connected to a cross shaft 15 mounted in bearings 16 which are carried by the automobile body. A coiled spring 17 is connected to the arm 14 and to the body in order to tension the arm so as to assist in throwing the fender to inoperative position, as hereinafter described. The upper end of a second arm 14' which is rigidly connected to the cross shaft 15 has a bolt 18 which extends through a slot 19 formed in the front end of a link 20, the bolt 18 being free to be moved in the slot 19, the link 20 being pivoted at its rear end to the arm 21 which forms part of the clutch collar 31 which is loosely mounted on the shaft A. A coiled spring 22 is secured to the upper end of the arm 14' and extends rearwardly therefrom and is connected to the body so as to tension the arm 14' in a direction opposite to that in which the spring 17 tensions the arm 14, the two springs coöperating to effect instant and desired positive movement of the shaft 15, and through the rod 13 the toggle joint and the fender.

In order to provide auxiliary means to actuate the shaft 15, and the aforementioned parts, a depressible or push rod 23 is provided and connects with the shaft 15 by an arm 24 which is rigidly secured to the shaft and adjustably secured to the depressible rod 23 by a bolt and slot connection 25. A cushioning member 26 is pivoted at 27 to the frame 2 and normally occupies vertical position above and at the rear of the fender 1, and is held in vertical position by means of a clip 28 which slides on an arched rod 29, the latter having its ends secured in or to the brackets 8 and 10.

In order to provide means whereby the fender is moved to operative position when the operator applies the emergency brake, the following mechanism is provided: A clutch collar 30 is rigidly mounted on the emergency brake shaft A, and is for engagement with a clutch collar 31 which is formed on the arm 21, a spring 32 surrounding shaft A and being interposed between the collars 30 and 31 in counterbored portions provided therefor in said collars so as to normally hold the collars separated. The fitting forming the cam 33 is provided with the sector gear 36 and is rigidly secured to the clutch collar 31 which is rotatably and reciprocally mounted on the shaft A. The cam 34 is non-rotatably supported on the shaft A and has the arm 35 which is mounted on the gear shift shaft B. Mounted on the gear shift shaft B to rotate and move therewith is the sector gear 37. This gear 37 is at all times in mesh with the gear 36 of the cam 33 so that when the gear shift shaft B is in the neutral position the cams 33 and 34 will be in the position shown in Fig. 7 and the emergency brake may be used independent of any action on the fender. It is particularly to be noted that the fender 1 and its frame 2 can be bodily lifted from engagement with the bearings 6 by moving the pins 4 through the slots 5. In order to vary the angular relationship between the fender and the surface of the road, frame 2 has abutments 7' adjustably secured thereto, which abutments engage the arms and thereby restrict the extent of downward movement of the fender. A strap S or its equivalent is employed to secure the entire structure in the raised position shown in dotted lines in Fig. 3. As depicted in Fig. 3 of the drawings the toggle levers have their common pivotal point extending beyond a line drawn between the pivotal points of the levers with brackets 10 and arms 7, thereby holding the fender locked in lifted or normal position.

The operation is as follows: The fender normally occupies the full line position shown in Fig. 3. The shaft B normally is in such position to effect mesh of the transmission gears, and when rotated to attain the desired meshing of the gears, the teeth of the sector gear 37 meshing with teeth 36 move cam 33, and since cam 34 is held against rotation by arm 35, the cam faces of said cams cause the teeth of the clutch collars 30 and 31 to mesh and lock, whereupon an obstacle being suddenly encountered, the operator applies the emergency brake without throwing off the power, thereby causing the arm 21 to actuate rod 20, and connected parts to thereby actuate rod 13 rearwardly, so as to move the toggle joint to the position shown in Fig. 1, in which the fender is in lowered or rescue position. When the gear shift lever is in neutral position, the clutch collars 30 and 31 are held in spaced relation, or out of engagement by the spring 32, whereby when the emergency brake shaft A is rotated, the cam 31 due to being loosely mounted on the shaft A will remain inoperative, thus enabling the emergency brake to be applied without effecting operation of the fender to rescue position. The push rod 23 is particularly designed for use by an attendant, so that the latter may throw the fender into rescue position, should the operator for any reason not actuate the fender by application of the emergency brakes. As shown in Fig. 1 when the car is to be cranked, the clips 28 of the cushioning member 26 are disengaged from the rods 29, whereupon the cushioning member by reason of its being hinged at 27 is lowered to the dotted line position.

Having thus described our invention, we claim as new and desire to secure by Letters Patent;—

1. In a device of the type set forth, a fender having bodily vertical movement, an emergency brake shaft and a gear shift shaft, a clutching device on the emergency shaft, means to normally hold the clutching device inoperative, cam members on the emergency shaft, to move the clutching device to operative position, means to hold one of the cam members against movement, means on the gear shift shaft to rotate the other cam member, and means in connection with one of the clutch members to operate the fender to lowered position.

2. In a device of the type set forth, a pair of vertical longitudinally slotted brackets, a pair of arms having their rear ends pivoted at points to the rear of the brackets and having their front ends slidingly extended through said bracket slots and terminating at points in front of the brackets, a fender connected to said front ends of the arms, a toggle connection in each bracket slot pivoted at its lower end to a relatively fixed point on the lower end of the bracket and at its upper end to the arms, and means to actuate the toggle connections.

3. In combination, with a pivoted fender, a toggle connection pivoted at its upper end to the fender beneath the latter, means to pivotally support the lower end of the connection, and means to operate said connection to move the common pivotal point of the same on one side of a line drawn vertically through the upper and lower pivotal points of the connection whereby to hold the fender locked in raised position.

4. In combination with a vertically movable fender, the transmission gears and the emergency brake of an automobile, means connecting the emergency brake with the fender to move the latter to rescue position, and means between said transmission and the brake whereby when the transmission is operative application of the brake will actuate said fender moving means and whereby when the transmission is in neutral position the brake may be applied without operation of the fender moving means.

5. In combination, with a vertically movable fender, the transmission and the emergency brake of an automobile, means for operating the fender from the brake when the transmission is in driving position and for allowing movement of the brake without movement of the fender when the transmission is in neutral position.

6. In combination, with a vertically movable fender, the transmission gear shaft, and an emergency brake shaft, a clutch on the emergency brake shaft having a rigid and a loose member, means connected to said loose clutch member to actuate the fender to rescue position, means between the shafts whereby when the gear shaft is in driving position said clutch will be automatically moved to locked position, and means between the shafts and engaged with the loose clutch member whereby when the brake shaft is rotated said loose clutch member will be moved to engage the rigid clutch member to actuate the fender and whereby when the brake shaft is rotated and the gear shaft is in neutral position, the loose clutch member will remain stationary.

7. In combination, with a fender movable to rescue position, the transmission shaft and the emergency brake shaft, means on the brake shaft to enable operation of the fender therefrom, means controlled by the transmission shaft whereby when the latter is in driving position said fender operating means will be locked to the brake shaft so that when the brake shaft is operated the fender operating means will actuate the fender and whereby when the transmission shaft is in neutral position the brake shaft may operate without moving the fender operating means.

8. In combination, with a fender movable to rescue position, the transmission and the emergency brake, means to enable actuation of the fender from and by movement of the emergency brake and means controlled by the transmission whereby when the latter is in driving position said fender actuating means will be operated by movement of the emergency brake and whereby when the transmission is in neutral position the brake may operate without movement of the fender actuating means.

In testimony whereof we have signed our names to this specification in the presence of two subscribing witnesses.

JOSEPH B. ARMITAGE.
GEORGE H. ARMITAGE.

Witnesses:
CHARLES T. WALKER,
ADA E. HAGERTY.

Copies of this patent may be obtained for five cents each, by addressing the "Commissioner of Patents, Washington, D. C."